(12) United States Patent
Zeng et al.

(10) Patent No.: US 12,090,576 B2
(45) Date of Patent: Sep. 17, 2024

(54) DEVICE AND METHOD FOR PROCESSING MICRO-CHANNEL ON MICROFLUIDIC CHIP USING MULTI-FOCUS ULTRAFAST LASER

(71) Applicants: Chongqing Institute of East China Normal University, Chongqing (CN); SHANGHAI LANGYAN OPTOELECTRONICS TECHNOLOGY CO., LTD., Shanghai (CN); East China Normal University, Shanghai (CN)

(72) Inventors: Heping Zeng, Chongqing (CN); Chuan Yang, Chongqing (CN); Mengyun Hu, Shanghai (CN); Shuai Yuan, Chongqing (CN)

( * ) Notice: Subject to any disclaimer, the term of this patent is extended or adjusted under 35 U.S.C. 154(b) by 0 days.

(21) Appl. No.: 17/329,251

(22) Filed: May 25, 2021

(65) Prior Publication Data
US 2021/0283722 A1    Sep. 16, 2021

(30) Foreign Application Priority Data

Jun. 11, 2020 (CN) .......................... 202010527388.6

(51) Int. Cl.
| | | |
|---|---|---|
| *B23K 26/55* | (2014.01) | |
| *B01L 3/00* | (2006.01) | |
| *B23K 26/067* | (2006.01) | |
| *B23K 26/361* | (2014.01) | |
| *B23K 26/70* | (2014.01) | |

(52) U.S. Cl.
CPC ........ *B23K 26/55* (2015.10); *B01L 3/502707* (2013.01); *B23K 26/067* (2013.01); *B23K 26/361* (2015.10); *B23K 26/702* (2015.10)

(58) Field of Classification Search
CPC .. B23K 26/067; B23K 26/702; B23K 26/361; B23K 26/55; B01L 3/502707
USPC ..................................................... 219/121.61
See application file for complete search history.

(56) References Cited

U.S. PATENT DOCUMENTS

| | | | | |
|---|---|---|---|---|
| 6,149,988 A | * | 11/2000 | Shinohara | .......... B23K 26/0738 |
| | | | | 219/121.75 |
| 6,586,704 B1 | * | 7/2003 | Cockeram | ............... B32B 18/00 |
| | | | | 219/121.64 |
| 6,747,243 B1 | * | 6/2004 | Reinhardt | ......... H01L 21/67028 |
| | | | | 219/121.69 |
| 7,615,722 B2 | * | 11/2009 | Govorkov | .......... B23K 26/0613 |
| | | | | 372/101 |

(Continued)

FOREIGN PATENT DOCUMENTS

| | | | | |
|---|---|---|---|---|
| CN | 103831536 A | | 6/2014 | |
| CN | 107140607 A | * | 9/2017 | ............. B22D 17/00 |

(Continued)

*Primary Examiner* — Jimmy Chou (57) ABSTRACT

A method for processing a micro-channel of a micro-fluidic chip using multi-focus ultrafast laser, in which an array-type multi-focus femtosecond laser is used to perform fractional ablation on the micro-fluidic chip, and then pulse laser is used to perform secondary ablation on the micro-fluidic chip. Ultrasonic-assisted hydrofluoric acid etching is performed on the micro-fluidic chip after ablation to obtain a true three-dimensional micro-channel on the micro-fluidic chip. A device for processing a micro-channel of a micro-fluidic chip using multi-focus ultrafast laser is also provided.

10 Claims, 11 Drawing Sheets

(56) References Cited

U.S. PATENT DOCUMENTS

| | | | | |
|---|---|---|---|---|
| 7,754,609 B1* | 7/2010 | Tan | ................. | C11D 2111/46 |
| | | | | 438/905 |
| 7,893,384 B2* | 2/2011 | Lin | ................. | B23K 26/03 |
| | | | | 219/121.68 |
| 8,329,117 B2* | 12/2012 | Thomas | ................. | B01L 7/52 |
| | | | | 422/68.1 |
| 8,492,737 B2* | 7/2013 | Araci | ................. | B82Y 20/00 |
| | | | | 250/493.1 |
| 8,951,819 B2* | 2/2015 | Lei | ................. | B23K 26/0661 |
| | | | | 438/33 |
| 10,518,358 B1* | 12/2019 | Laskin | ................. | B23K 26/53 |
| 2002/0086245 A1* | 7/2002 | Zait | ................. | B23K 26/0624 |
| | | | | 430/945 |
| 2003/0052102 A1* | 3/2003 | Amako | ................. | B23K 26/0624 |
| | | | | 219/121.75 |
| 2003/0111447 A1* | 6/2003 | Corkum | ................. | B23K 26/0624 |
| | | | | 219/121.76 |
| 2004/0224321 A1* | 11/2004 | Nicolau | ................. | B01J 19/0046 |
| | | | | 435/6.19 |
| 2005/0064137 A1* | 3/2005 | Hunt | ................. | B23K 26/361 |
| | | | | 428/188 |
| 2006/0169677 A1* | 8/2006 | Deshi | ................. | B23K 26/382 |
| | | | | 219/121.7 |
| 2006/0261050 A1* | 11/2006 | Krishnan | ................. | B23K 26/364 |
| | | | | 219/121.72 |
| 2008/0053970 A1* | 3/2008 | Nakamae | ................. | B23K 1/0056 |
| | | | | 219/121.61 |
| 2008/0121627 A1* | 5/2008 | Bruland | ................. | B23K 26/042 |
| | | | | 257/E23.15 |
| 2008/0124816 A1* | 5/2008 | Bruland | ................. | B23K 26/082 |
| | | | | 257/E23.15 |
| 2009/0061161 A1* | 3/2009 | Sheehan | ................. | B44C 1/228 |
| | | | | 219/121.73 |
| 2011/0278267 A1* | 11/2011 | Kawakami | ................. | B23K 26/364 |
| | | | | 219/121.67 |
| 2013/0075374 A1* | 3/2013 | Mitsugi | ................. | H01L 33/0093 |
| | | | | 219/121.61 |
| 2013/0284710 A1* | 10/2013 | Hoff | ................. | B23K 26/364 |
| | | | | 372/45.01 |
| 2014/0083984 A1* | 3/2014 | Gerke | ................. | B23K 26/0624 |
| | | | | 219/121.61 |
| 2015/0038313 A1* | 2/2015 | Hosseini | ................. | B23K 26/0648 |
| | | | | 219/121.75 |
| 2016/0168399 A1* | 6/2016 | Matoda | ................. | C01G 29/00 |
| | | | | 428/206 |
| 2016/0199935 A1* | 7/2016 | Chen | ................. | G01J 3/12 |
| | | | | 219/121.61 |
| 2016/0250714 A1* | 9/2016 | Zhang | ................. | B23K 26/36 |
| | | | | 219/121.61 |
| 2017/0326816 A1* | 11/2017 | Seepersad | ................. | B29C 64/291 |
| 2018/0304352 A1* | 10/2018 | Mortensen | ................. | B22D 17/00 |
| 2018/0353961 A1* | 12/2018 | Chang | ................. | D01D 11/06 |
| 2021/0299658 A1* | 9/2021 | Zeng | ................. | B23K 26/0643 |

FOREIGN PATENT DOCUMENTS

| | | | | |
|---|---|---|---|---|
| CN | 107243698 B | | 12/2018 | |
| CN | 108723586 B | | 12/2019 | |
| JP | 2016531002 A | * | 10/2016 | ........... B23K 26/382 |

* cited by examiner

$t_1$: Pulse width of multi-focus femtosecond laser for fractional ablation
Δt: Delay time of ultra-short pulse laser
$t_2$: Pulse width of ultra-short laser for secondary ablation
T: One cycle

Fig. 6A t₁: Pulse width of multi-focus femtosecond laser for fractional ablation Δt: Delay time of ultra-short pulse laser t₂: Pulse width of ultra-short laser for secondary ablation T: One cycle

DEVICE AND METHOD FOR PROCESSING MICRO-CHANNEL ON MICROFLUIDIC CHIP USING MULTI-FOCUS ULTRAFAST LASER

CROSS-REFERENCE TO RELATED APPLICATIONS

This application claims the benefit of priority from Chinese Patent Application No. 202010527388.6, filed on Jun. 11, 2020. The content of the aforementioned application, including any intervening amendments thereto, is incorporated herein by reference in its entirety.

TECHNICAL FIELD

This application relates to ultrafast laser micro-nano fabrication, and more particularly to a device and method for processing a micro-channel of a micro-fluidic chip using multi-focus ultrafast laser.

BACKGROUND

Micro-fluidic technology, as an emerging analysis and detection technology, can promote the miniaturization/integration of analytical instruments and render these instruments portable, greatly shortening the sample processing time. The micro-fluidic technology can also achieve the maximum use of reagents and consumables through precisely controlling the liquid flow. The micro-fluidic chip is a chip of several square centimeters on which the basic operating units involved in the biological and chemical fields are integrated, so as to enable the miniaturization of traditional laboratories and the integration of sampling, dilution, reagent addition, reaction, separation and detection. Moreover, the chip can be repeatedly used. Currently, the micro-fluidic chips are mainly made of silicon materials, glass materials and polymer materials. Micro-fluidic chips have broad prospects in biomedical research, drug synthesis and screening, environmental detection and protection, health quarantine, judicial identification, biological reagent detection, etc. At present, how to realize the high-precision and high-efficiency processing of true three-dimensional complex micro-channels of micro-fluidic chips still remains unsolved in the related art.

Femtosecond laser is a cold processing technique, and there is no obvious thermal effect on the surrounding of the materials. Femtosecond laser is an ultrafast pulse laser, and has short interaction time, such that the photon energy will not diffuse and the photon energy absorbed by the material effectively acts on the electron excitation rather than convert into heat. Therefore, the femtosecond laser processing has an extremely low thermal effect, and is thus suitable for the high-quality and high-precision processing of the micro-nano structure. As an advanced and promising micro-nano processing technology, the femtosecond laser can be widely used in the fabrication of micro-fluidic chips. At present, the commonly-used micro-fluidic chip processing methods are limited to process planar two-dimensional micro-fluidic channels, and cannot process the true three-dimensional micro-fluidic channels. By comparison, the femtosecond laser micro-nano processing technique is suitable for the fabrication of the three-dimensional micro-nano structure inside the material. Specifically, the femtosecond laser is focused inside the transparent micro-fluidic chip substrate material to fabricate the complex three-dimensional micro-channel structure by ablation. Chinese Patent Application publication No. 103831536 A and Chinese Patent Nos. 107243698B and 108723586B all disclosed a method of forming a three-dimensional micro-channel in a transparent material such as fused silica and polymers by ablation using a single beam of femtosecond laser. Unfortunately, there are still some limitations in the ablation with the tightly-focused single femtosecond laser beam. For example, in order to fabricate the micro-fluidic channels with desired structural size, the ablation process requires high laser energy or repeated scanning, which leads to low processing efficiency. Therefore, it is very necessary to develop a method for efficiently processing micro-fluidic channels using femtosecond laser. The array-type multi-focus femtosecond laser output based on the laser multi-focus technology can realize the high-efficiency preparation and processing of micro-channels of the micro-fluidic chip, and is expected to become a mainstream micro-fluidic chip preparation method in the future along with the continuous development of the micro-fluidic chip.

SUMMARY

An object of this application is to provide a device and method for processing a micro-channel of a micro-fluidic chip using multi-focus ultrafast laser, in which the array-type multi-focus femtosecond laser is output by using laser multi-focus technology to efficiently process micro-fluidic chips, thereby ensuring the high processing precision, improving the ablation efficiency, reducing the energy of a single laser beam and enhancing the processing safety and flexibility. The multi-focus processing facilitates the large-scale processing of micro-channels on micro-fluidic chips.

Technical solutions of this application are described as follows.

In a first aspect, this application provides a method for processing micro-channels of a micro-fluidic chip using multi-focus ultrafast laser, comprising:

(1) converting femtosecond laser into an array-type multi-focus femtosecond laser using a laser multi-focus technology to perform fractional ablation on a section of micro-channels to be processed of the micro-fluidic chip;

(2) performing a secondary ablation on the micro-channels to be processed of the micro-fluidic chip using a picosecond or a femtosecond ultra-short pulse laser; and (3) subjecting the micro-fluidic chip to ultrasonic-assisted hydrofluoric acid etching to dredge the micro-channels after undergoing the fractional ablation and the secondary ablation;

wherein the fractional ablation is a main ablation process in processing of the micro-channels to be processed of the micro-fluidic chip; and the secondary ablation is a secondary ablation process in the processing of the micro-channels of the micro-fluidic chip.

In some embodiments, the femtosecond laser is a laser with medium-high energy, and used as a main light source in the processing of the micro-channels of the micro-fluidic chips; the femtosecond laser has a single pulse energy equal to or greater than 10 µJ and a pulse width equal to or less than 200 fs; center wavelengths of the femtosecond laser are 260 nm, 343 nm and 355 nm in ultraviolet range; 400 nm, 515 nm and 532 nm in visible light range; and 800 nm, 1030 nm, 1064 nm and 1550 nm in infrared range; the picosecond or femtosecond ultra-short pulse laser for the secondary ablation is used as a secondary light source in the processing of the micro-channels of the micro-fluidic chip; center wavelengths of the picosecond or femtosecond ultra-short pulse laser are 1030 nm and 1064 nm; individual focuses of the femtosecond laser are synchronous or asynchronous.

In some embodiments, after the fractional ablation, a size of a non-ablated area between the individual focuses is less than or equal to 200 μm; and the micro-fluidic chip is made of a fused silica material, calcium fluoride, a transparent ceramic or an organic polymer doped with $SiO_2$.

In some embodiments, the laser multi-focus technology enables an array output of the femtosecond laser, and the array-type multi-focus femtosecond laser is an array-type planar two-dimensional multi-focus femtosecond laser or an array-type spatial three-dimensional multi-focus femtosecond laser; and the laser multi-focus technology is spatial light modulation technology, micro-lens array technology, micro-hole array technology, optical fiber array technology or a combination thereof;

the spatial light modulation technology is used to output the array-type spatial three-dimensional multi-focus femtosecond laser using a spatial light modulator through tight focusing of a high-power objective lens;

the micro-lens array technology is used to output the array-type planar two-dimensional multi-focus femtosecond laser by using a micro-lens array;

the micro-hole array technology is able to split the femtosecond laser into an array-type beam by using a microhole array, and then focus the array-type beam to output the array-type planar two-dimensional multi-focus femtosecond laser; and the optical fiber array technology enables a laser to directly output array-type beam by using optical fiber beam splitting cascade amplification or seed light beam splitting multipath amplification, and then focuses the array-type beam to output the array-type planar two-dimensional multi-focus femtosecond laser.

In some embodiments, the array-type planar two-dimensional multi-focus femtosecond laser adopts a loose focusing mode with a focal length of 5-100 mm; the array-type planar two-dimensional multi-focus femtosecond laser has an array-type multi-focus distribution in a section direction of a laser beam; the array-type planar two-dimensional multi-focus femtosecond laser generates multiple plasma light filaments in a transmission direction of the laser beam; and the array-type planar two-dimensional multi-focus femtosecond laser is used to process longitudinal and transverse micro-channels of the micro-fluidic chip by femtosecond laser multi-focus ablation and femtosecond laser multi-light-filament ablation;

the array-type spatial three-dimensional multi-focus femtosecond laser adopts a tight focusing mode with a focal length of 0-5 mm; the array-type spatial three-dimensional multi-focus femtosecond laser has an array-type multi-focus distribution in both the section direction and the transmission direction of the laser beam; and the array-type spatial three-dimensional multi-focus femtosecond laser is used to process the longitudinal and transverse micro-channels of the micro-fluidic chip by using the femtosecond laser multi-focus ablation;

array mode, array pitch and array range of the array-type planar two-dimensional multi-focus femtosecond laser and the array-type spatial three-dimensional multi-focus femtosecond laser are adjustable; and the multiple plasma light filaments in the transmission direction of the laser beam are adjustable, so as to meet requirements of shape and size of the micro-channel of the micro-fluidic chip.

In some embodiments, the array-type spatial three-dimensional multi-focus femtosecond laser is distributed in a spatial array, and the array mode, array pitch and array range are adjustable to make a contour size of the array-type spatial three-dimensional multi-focus femtosecond laser consistent with a size of the micro-channel; the number of focuses and a focus distance of the femtosecond laser are adjusted to control and improve a processing precision for a shape of sections of the micro-channel, so that the sections of the micro-channel processed in different directions are kept consistent; the array-type spatial three-dimensional multi-focus femtosecond laser is able to realize multi-shape and large-scale processing of the micro-channel of the micro-fluidic chip; the shape of the sections of the micro-channel is circle, ellipse, rectangle or triangle; and a single scanning ablation of the multi-focus femtosecond laser is able to complete processing of a micro-channel of a millimeter-level micro-fluidic chip.

In some embodiments, the array-type spatial three-dimensional multi-focus laser is configured to distribute laser energy according to positions of the focuses of the femtosecond laser, and adjust a power of multi-focus laser to be greater than a damage threshold of a material of the micro-fluidic chip, so as to meet ablation processing requirements of the micro-channel on the micro-fluidic chip.

In some embodiments, the secondary ablation is performed by scanning the micro-channel of the micro-fluidic chip single time or multiple times with the picosecond or femtosecond ultra-short pulse laser to realize a stealth dicing effect on a non-ablated area of the micro-channel between focuses, and enhance an impact effect, thermal effect and multiphoton effect on the non-ablated area of the micro-channel.

In some embodiments, a pulse delay of the picosecond or femtosecond ultra-short pulse laser is controlled, such that a pulse of the picosecond or femtosecond ultra-short pulse laser is controlled to be after a pulse of the multi-focus femtosecond laser, enabling the secondary ablation while the fractional ablation is performed;

a pulse delay time is 10 ps-200 ns; or the secondary ablation is performed in the same scan path as the fractional ablation after the fractional ablation is completed.

In some embodiments, the array-type multi-focus femtosecond laser and the picosecond or femtosecond ultra-short pulse laser are focused to a position to be processed in the same direction by beam combining; or the array-type multi-focus femtosecond laser and the picosecond or femtosecond ultra-short pulse laser re focused to the position to be processed in different directions, respectively; and directions of the array-type multi-focus femtosecond laser and the picosecond or femtosecond ultra-short pulse laser are parallel or perpendicular to each other.

In some embodiments, in the ultrasonic-assisted hydrofluoric acid etching, an ablated area on the micro-channel is etched by hydrofluoric acid, and a non-ablated area is detached during ultrasonic treatment; and the ultrasonic-assisted hydrofluoric acid etching is performed after the fractional ablation, or after the secondary ablation.

In a second aspect, this application provides a device implementing the method above, comprising:

a light source part;

a focusing part;

a processing part;

a real-time monitoring part; and a control part.

In some embodiments, the light source part comprises a first ultrafast laser for performing the fractional ablation, a second ultrafast laser for performing the secondary ablation, a multi-focus array device for outputting the array-type multi-focus femtosecond laser and a pulse delayer for realizing delay control of a pulse of the picosecond or femtosecond ultra-short pulse laser in the secondary ablation; and the light source part is configured to output the array-type multi-focus femtosecond laser and the picosecond or femtosecond ultra-short pulse laser with pulse delay to perform ablating on the micro-fluidic chip.

In some embodiments, the focusing part is selected from the group consisting of a microscope objective, a lens, a galvanometer scanner and a combination thereof.

In some embodiments, the processing part comprises a raw material of the micro-fluidic chip, a platform and a three-dimensional micro-nano processing platform for controlling a movement of the raw material of the micro-fluidic chip in X, Y and Z directions; and the processing part is configured to realize high-precision control of a scanning path for the micro-channel on the micro-fluidic chip.

In some embodiments, the real-time monitoring part comprises a vertical charge coupled device (CCP) and a transverse CCD used for real-time monitoring processing position and depth of the micro-channel to be processed, respectively.

In some embodiments, the control part is configured to enable integrated control of the light source part, the three-dimensional micro-nano processing platform and the real-time monitoring part.

Compared to the prior art, this application has the following beneficial effects.

Different from the method of directly ablating and processing micro-fluidic chips with a single light beam, this application can generate an array-type multi-focus femtosecond laser in the section of the micro-channel, so the single focus position does not need too high single pulse energy, making the substrate material of the micro-fluidic chip less prone to destructive damage. In addition, the array-type multi-focus femtosecond laser of this application can obtain the size of the micro-channel in a single scan, and the uniformity of the sections of the micro-channel in any direction is extremely high. Compared with the soft lithography technology, this application can directly process the continuous, arbitrary and complex three-dimensional micro-channels of the micro-fluidic chip without a mask. The processing of this application is more concise, and the processed three-dimensional micro-channels are more flexible and controllable.

This application ensures high precision of ablating micro-channels, improves the ablation processing efficiency, reduces the energy of a single laser beam and enhances the safety and flexibility of processing. This application can realize large-scale processing of the micro-channels of the micro-fluidic chips. This application can realize the processing of the micro-channels of the micro-fluidic chip made of glass and polymer materials, and can be used for the preparation of micro-fluidic chip made of fused quartz, calcium fluoride, transparent ceramics, organic polymer doped with $SiO_2$, etc., especially the preparation of micro-fluidic chips made of fused quartz.

In the drawings, 01, femtosecond laser source; 02, picosecond laser source; 03, computer control system; 04, high precision three-dimensional movable platform; 05, spatial light modulator; 06, first lens; 07, second lens; 08, first half-wave plate; 09, first polarization beam splitter; 10, polarization beam combiner; 11, third lens; 12, fourth lens; 13, second half-wave plate; 14, second polarization beam splitter; 15, reflecting mirror; 16, pulse delayer; 17, vertical CCD; 18, fifth lens; 19, dichroic mirror; 20, first high-power focusing objective; 21, second visible light source; 22, first visible light source; 23, fused silica micro-fluidic chip; 24, sample platform; 25: second high-power focusing objective; 26, transverse CCD; 100, light source part; 101, first ultrafast laser; 102, second ultrafast laser; 103, multi-focus array device; 104, pulse delay system; 400, real-time monitoring part; 401, vertical CCD imaging system; 402, transverse CCD imaging system; 200, focusing part; 300, processing part; 301, platform; 302, three-dimensional micro-nano processing platform; and 500, control part.

DETAILED DESCRIPTION OF EMBODIMENTS

The disclosure will be further described below in detail with reference to the accompanying drawings and the embodiments. In these exemplary embodiments, the array-type spatial three-dimensional multi-focus femtosecond laser is output through the spatial light modulation technology to prepare a micro-channel with a circular section on a fused silica micro-fluidic chip. It should be understood that these embodiments are merely illustrative of the disclosure, and are not intended to limit the disclosure. Any modifications and changes made by those skilled in the art without departing from the spirit of the disclosure shall fall within the scope of the disclosure.

Figure 1:
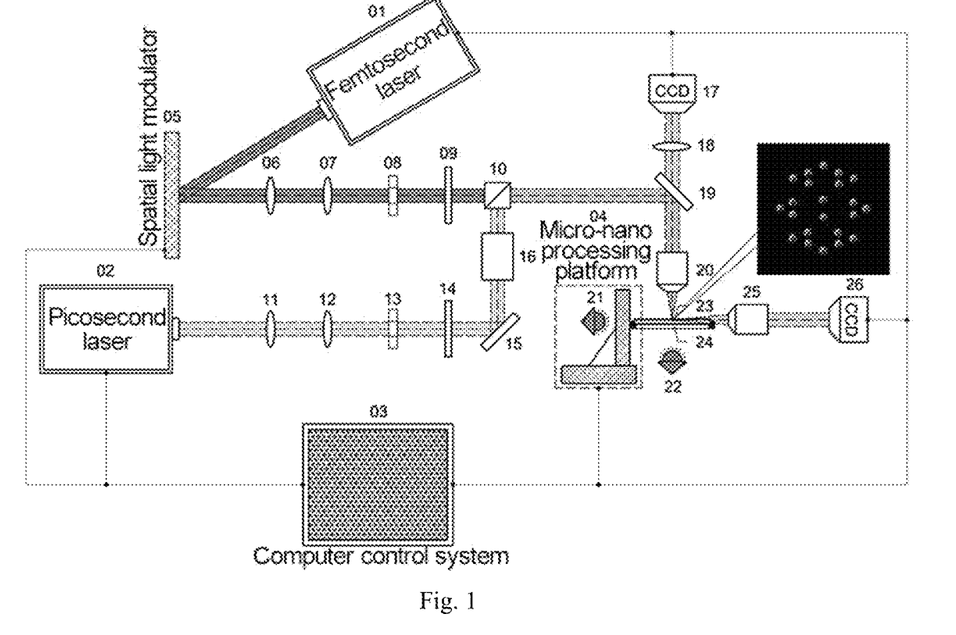
FIG. 1 is a schematic diagram of an optical path of processing micro-channels of a micro-fluidic chip using spatial light modulation technology according to an embodiment of the disclosure.

As shown in FIG. 1, the femtosecond laser generates an array-type spatial three-dimensional laser through a spatial light modulator 05, and then pass through the first lens 06 and the second lens 07, first half-wave plate 08, and first polarization beam splitter 09 to shape and shrink the beam, adjust the polarization state and the laser power to meet the input state of the polarization beam combiner 10.

The picosecond laser beam pass through the third lens 11 and the fourth lens 12, second half-wave plate 13, second polarization beam splitter 14 and mirror 15 to shape and shrink the beam, adjust the polarization state and the laser power to meet the input state of the polarization beam combiner 10. The picosecond laser delay is controlled by the pulse delayer 16, so that the picosecond laser pulse is delayed from the femtosecond laser pulse.

After the femtosecond laser and picosecond laser are combined by the polarization beam combiner 10, the femtosecond laser is condensed by a high-power focusing objective to form an array-type spatial three-dimensional multi-focus laser, which acts on the micro-fluidic chip made of fused silica 23. The ablation processing of the micro-channels of the micro-fluidic chip made of fused silica is realized by controlling the high precision three-dimensional movable platform 04. The picosecond laser is condensed by the high-power focusing objective to form a single focus laser, and acts on the micro-fluidic chip made of fused silica 23 to realize the secondary ablation of the micro-channel. A vertical CCD imaging system consisting of a vertical CCD 17, a first high-power focusing objective 20 and a first visible light source 22 and a transverse CCD imaging system consisting of a second visible light source 21, a second high-power focusing objective 25 and a transverse CCD 26 are respectively configured to monitor the processing position and longitudinal depth in real time.

Figure 2:
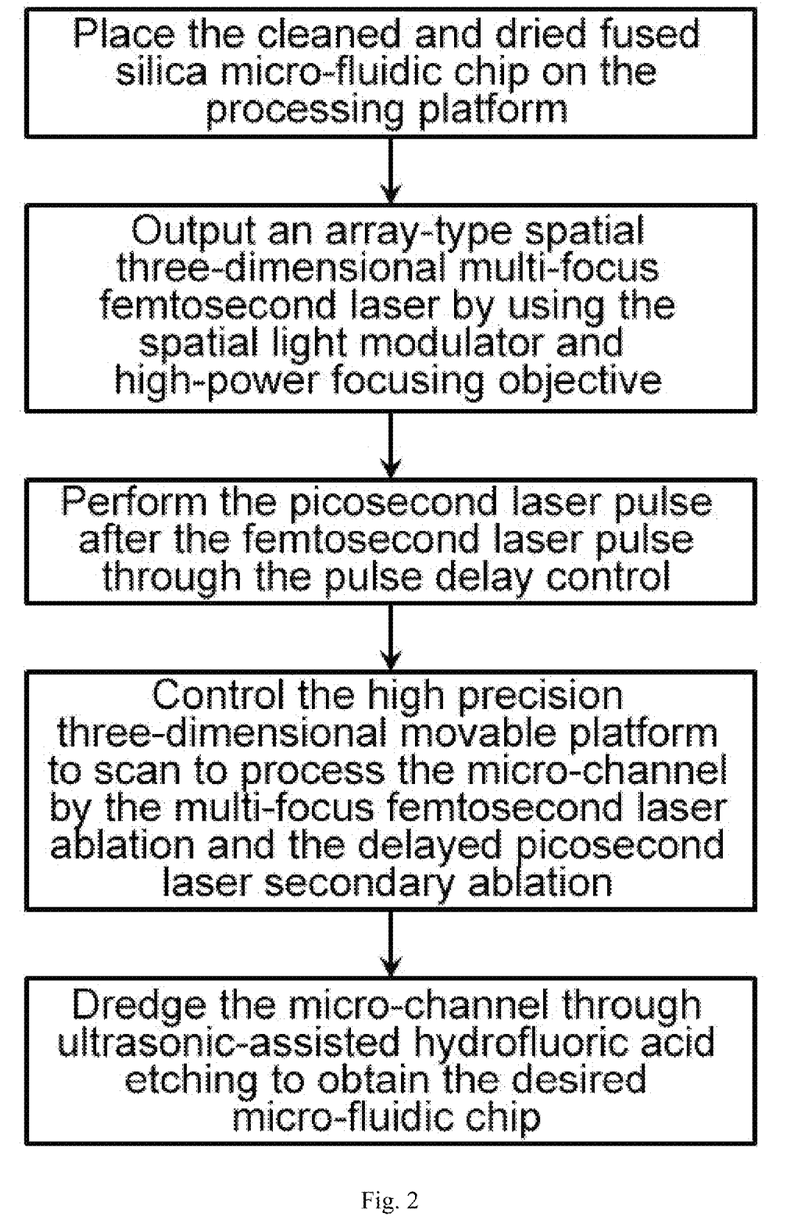
FIG. 2 is a flow chart of a preparation method according to an embodiment of the disclosure.

As shown in FIG. 2, the specific preparation process is described as follows.

The micro-fluidic chip made of fused silica 23 is cleaned and dried, and then placed on the sample platform 24.

Then, an array-type spatial three-dimensional multi-focus femtosecond laser for processing micro-channel with a circular section is output by using the spatial light modulator 05 and the high-power focusing objective. As shown in FIG. 1, each focus is evenly distributed on a spherical contour surface. The distance between the output focuses of the femtosecond laser is controlled to be equal to or less than 200 μm by the computer.

The picosecond laser delay is controlled by the pulse delayer 16, so that the picosecond laser pulse is delayed to be after the femtosecond laser pulse. A combination of the array-type spatial three-dimensional multi-focus femtosecond laser-picosecond laser is output through polarization beam combiner 10.

Subsequently, the high precision three-dimensional movable platform 04 is controlled by a computer to make the array-type spatial multi-focus femtosecond laser ablate the micro-fluidic chip made of fused silica 23. At the same time, the delay-controlled picosecond laser performs secondary ablation on the fused silica micro-fluidic chip 23, increasing the impact on the non ablated area between the multiple focuses of the femtosecond laser.

Finally, the ablated micro-channels of the fused silica micro-fluidic chip 23 are subjected to ultrasonic-assisted hydrofluoric acid etching, in which the ablated area will be corroded by hydrofluoric acid, and the non ablated area will fall off during the ultrasonic treatment. 10-30% hydrofluoric acid is used to etch the fused silica micro-fluidic chip 23 for 15-45 min, and a micro-fluidic chip with a clean micro-channel cavity is obtained after cleaning and drying. The patency of the micro-channel can be further determined by injecting a dyed microfluid.

Figure 3:
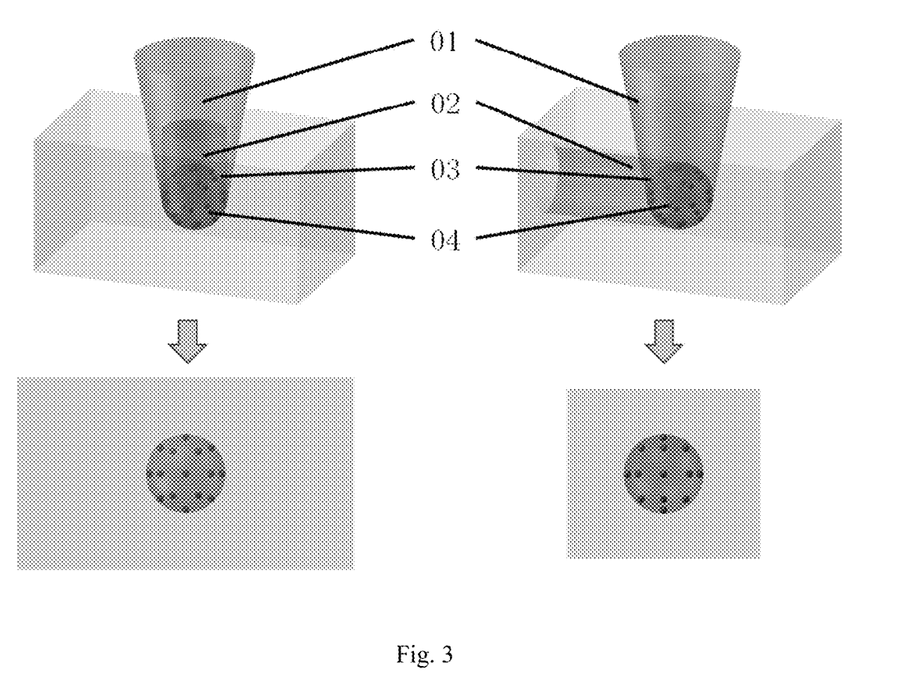
FIG. 3 is a schematic diagram of processing a longitudinal micro-channel and a transverse micro-channel of a micro-fluidic chip with a circular section according to an embodiment of the disclosure.
Figure 4A:
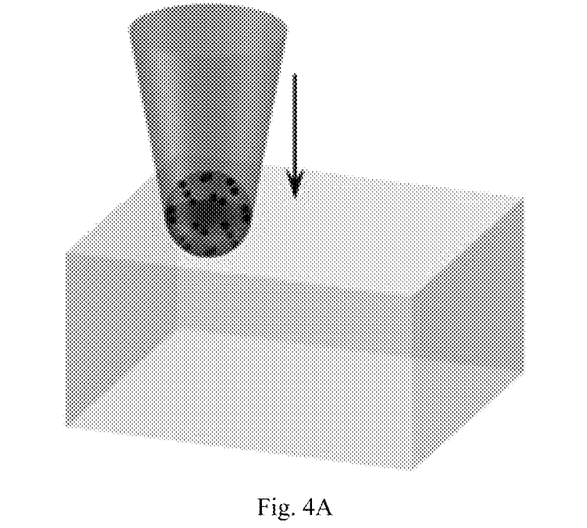
FIG. 4A-E is a schematic diagram of processing a three-dimensional micro-channel of a micro-fluidic chip with a circular section according to an embodiment of the disclosure.
Figure 4B:
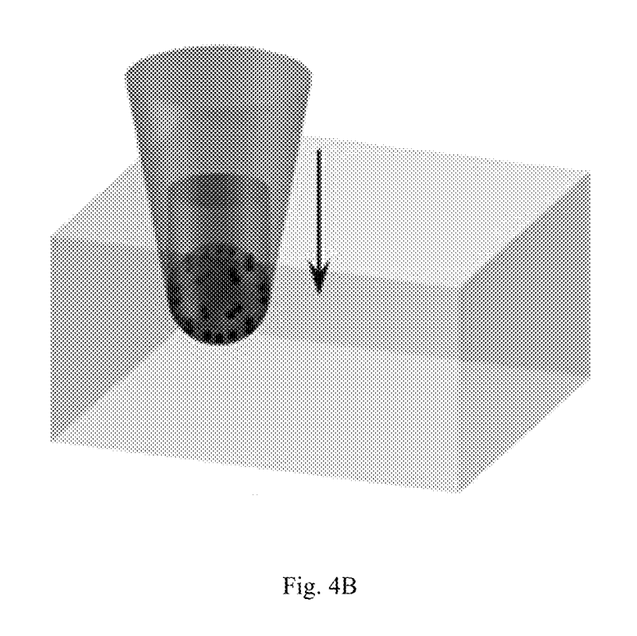
Figure 4C:
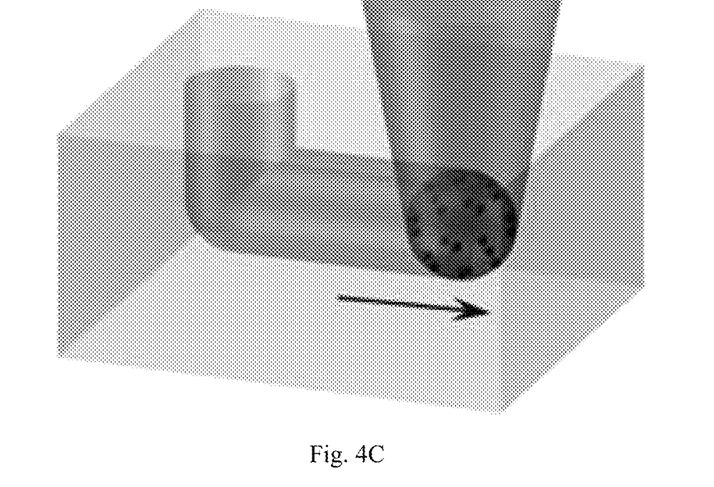
Figure 4D:
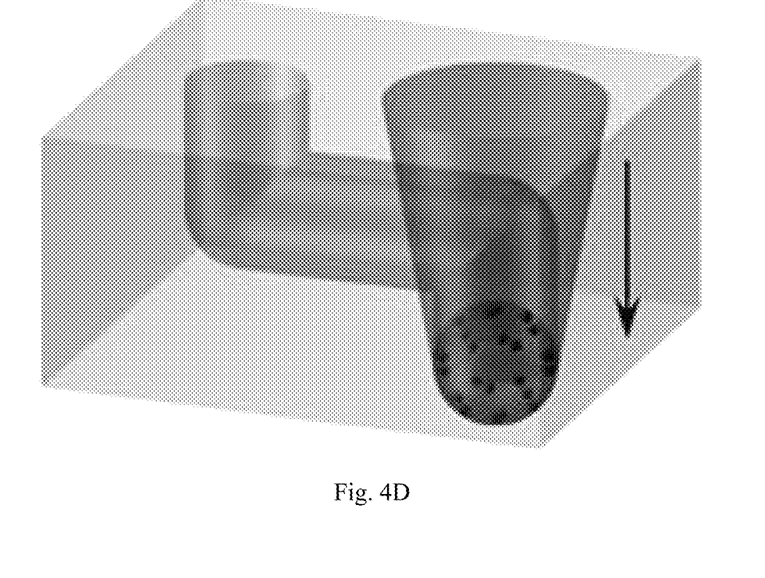
Figure 4E:
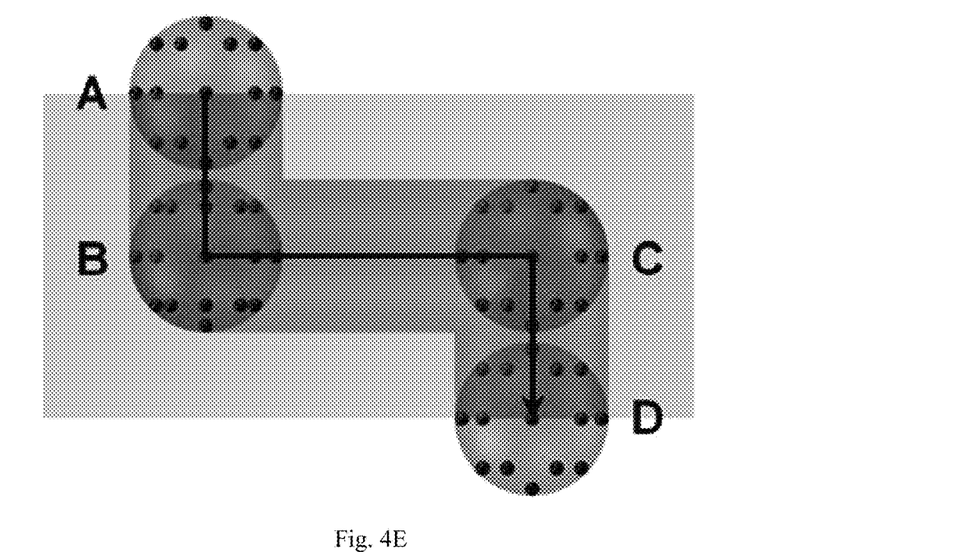

FIG. 3 shows a schematic diagram of processing a micro-channel of a micro-fluidic chip made of fused silica 23 by using a modulated array-type spatial three-dimensional spherical multi-focus femtosecond laser, in which a femtosecond laser beam 01, a micro-channel of the micro-fluidic chip, an ablation processing area and an array-type spatial three-dimensional multi-focus femtosecond laser are presented. As shown in the left part of FIG. 3, when the processing direction of the micro-channel is parallel to the direction of the laser, the projection of the multi-focus laser on the section of the micro-channel is the laser ablation of micro-fluidic chip made of fused silica 23. The outermost circular multi-focus laser is used to ablate the outer contour of the micro-channel, and the inner multi-focus laser ablates the fused silica material inside the micro-channel. The outline of the micro-channel and the fused silica material inside the micro-channel can be fully ablated by controlling the laser energy of each focus.

As shown in the right part of FIG. 3, when the processing direction of the micro-channel is perpendicular to the direction of the laser, the projection of the multi-focus laser on the section of the micro-channel is the laser ablation of the fused silica micro-fluidic chip 23. The outermost circular multi-focus laser is to ablate the outer contour of the micro-channel, and the inner multi-focus ablates the fused silica material inside the micro-channel. The outline of the micro-channel and the fused silica material inside the micro-channel can be fully ablated by controlling the laser energy of each focus.

The array-type spatial three-dimensional spherical multi-focus femtosecond laser modulated in this embodiment can map a circular contour with a same size in each projection direction, and the internal focus position and energy distribution are controllable, so that the ablation of the micro-channel in any direction can be realized.

FIG. 4 shows a schematic diagram of processing a three-dimensional micro-channel of a micro-fluidic chip made of fused silica using a modulated array-type spatial three-dimensional spherical multi-focus femtosecond laser. The outer corners at the corners of micro-channel on the micro-fluidic chip made of fused silica 23 have rounded features consistent with the contours of the array-type spatial three-dimensional multi-focus femtosecond laser, and the inner corners at the corners of the micro-channel on the fused silica micro-fluidic chip 23 have features consistent with the scanning path. This method can realize the ablation processing of the complex three-dimensional micro-channel inside the fused silica micro-fluidic chip 23.

Figure 5:
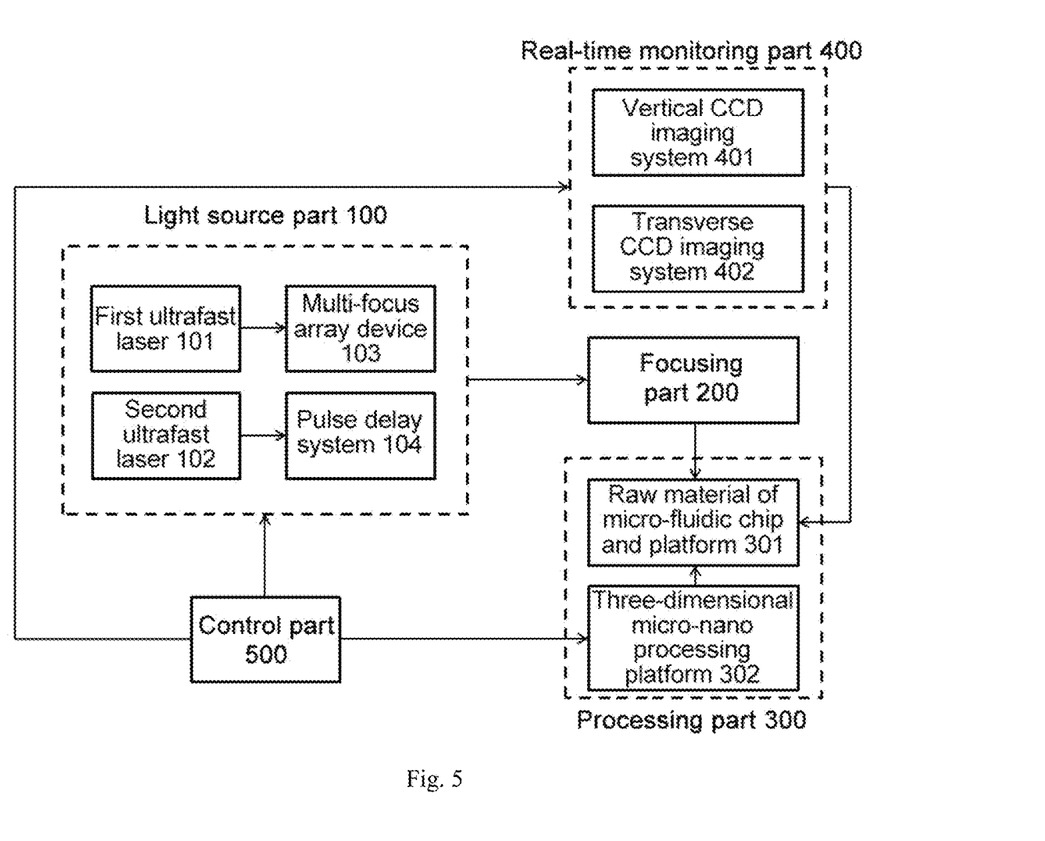
FIG. 5 is a schematic diagram of device for ablating micro-channel of a micro-fluidic chip using multi-focus ultrafast laser according to an embodiment of the disclosure.
Figure 6A:
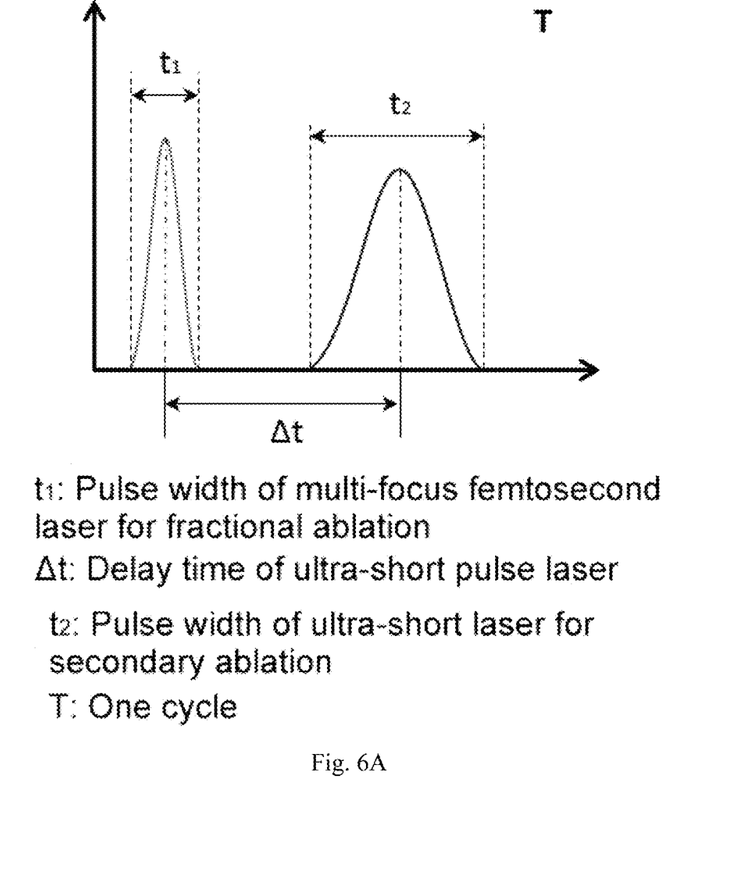
FIG. 6A-B is a schematic diagram of a pulse timing of a multi-focus femtosecond laser and a picosecond or femtosecond ultra-short pulse laser according to an embodiment of the disclosure.
Figure 6B:
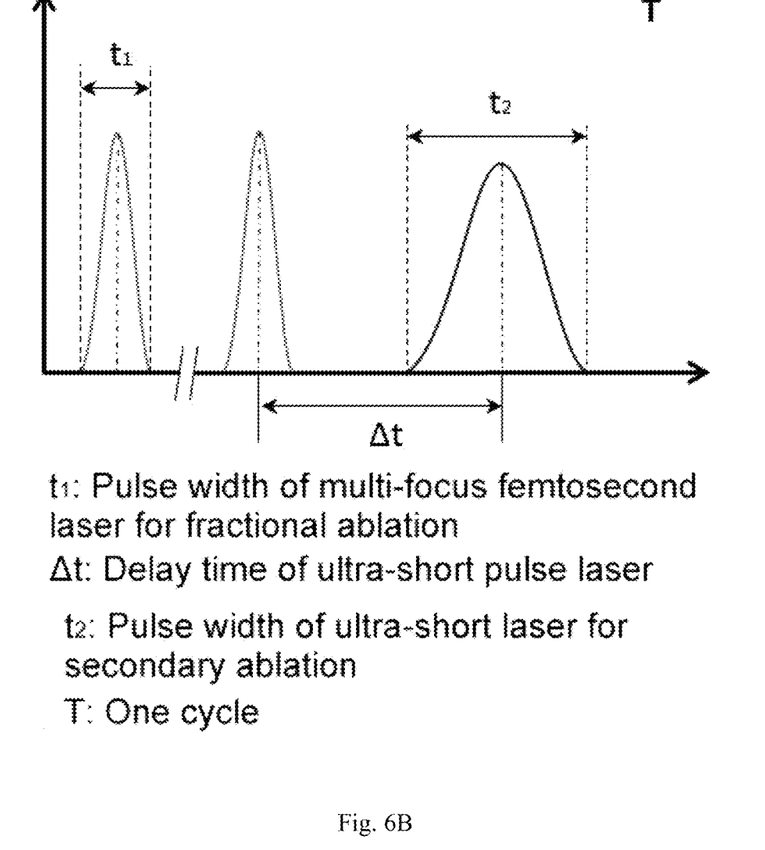

FIG. 5 shows a schematic diagram of device for ablating micro-channel of a micro-fluidic chip using multi-focus ultrafast laser, in which a light source part 100, a focusing part 200, a processing part 300, a real-time monitoring part 400 and a control part 500. The light source part 100 includes a first ultrafast laser 101, a second ultrafast laser 102, a multi-focus array device 103 and a pulse delayer 104, which realizes the output of an array-type multi-focus femtosecond laser and a pulse-delayed secondary ablation ultra-short pulse laser. FIG. 6 shows a schematic diagram of a pulse timing of a multi-focus femtosecond laser and a secondary ablation pulsed laser, and the ultra-short pulse laser for performing the second ablation can be controlled after a single pulse or several continuous pulses of the multi-focus femtosecond laser for performing the fractional ablation.

The multi-focus array device 103 based on the laser multi-focus technology can output a target array-type planar two-dimensional multi-focus femtosecond laser and the array-type spatial three-dimensional multi-focus femtosecond laser in the processing part 300. The specific implementation is as follows.

The array-type spatial three-dimensional multi-focus femtosecond laser is output by using spatial light modulation technology. The holographic phase map is calculated by computer holography, and the holographic phase map is loaded on the spatial light modulator. The target array-type spatial three-dimensional multi-focus femtosecond laser is output after being focused by the focusing part 200. In particularly, the array-type planar two-dimensional multi-focus femtosecond laser can also be output by using spatial light modulation technology.

The micro-lens array technology is used to output an array-type planar two-dimensional multi-focus femtosecond laser. The required micro-lens array is designed by optimizing the arrangement of the micro-lenses. The femtosecond laser passes through the micro-lens array and the focusing part 200 sequentially to focus and output the target array-type planar two-dimensional multi-focus femtosecond laser.

The micro-hole array technology is used to output planar two-dimensional multi-focus femtosecond laser. The required micro-hole array is designed by optimizing the arrangement of the micro-holes. The femtosecond laser is split into array-type beam through the micro-hole array, and then the array-type beam is focused by the focusing part 200 to output the target array-type planar two-dimensional multi-focus femtosecond laser.

The optical fiber array technology enables a laser to directly output an array-type beam by using optical fiber beam splitting cascade amplification or seed light beam splitting multipath amplification, and then focuses the array-type beam by the focusing part 200 to output the array-type planar two-dimensional multi-focus femtosecond laser.

Figure 7A:
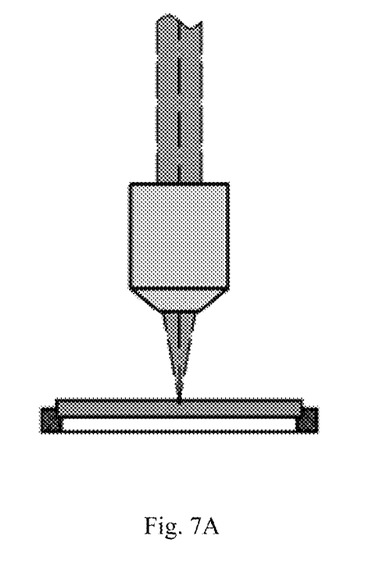
FIG. 7A-C is a schematic diagram of a focusing mode of a focusing part according to an embodiment of the disclosure.
Figure 7B:
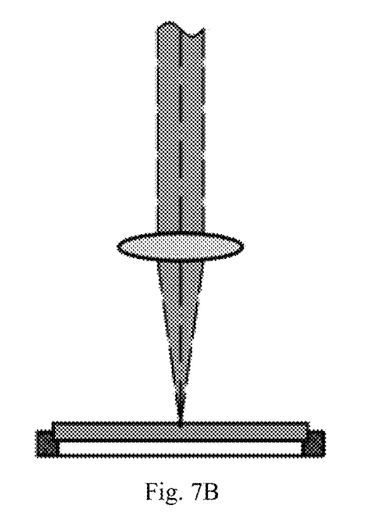
Figure 7C:
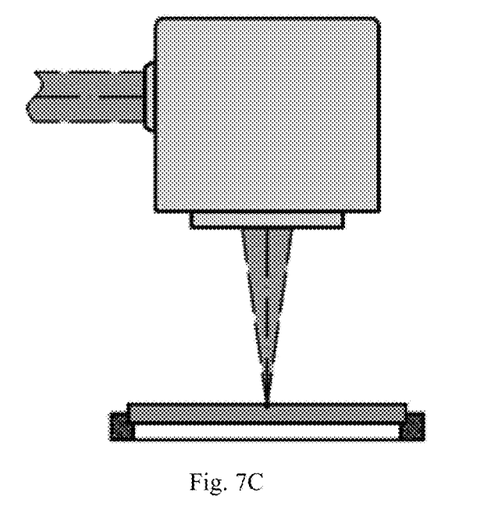

The focusing part 200 is selected from the group consisting of a microscope objective, a lens, a galvanometer scanner and a combination thereof. As shown in FIG. 7, the output of the array-type spatial three-dimensional multi-focus femtosecond laser can be realized by the tight focusing mode. The array-type planar two-dimensional multi-focus femtosecond laser can be realized by the loose focusing mode. The laser power and focal length are adjustable to realize the control of the femtosecond laser in the longitudinal multi-light-filament.

The processing part 300 includes a platform 301, and a three-dimensional micro-nano processing platform 302 for controlling a high precision movement of a raw material of the micro-fluidic chip in X, Y and Z directions, which can realize the control of the high-precision three-dimensional processing scanning path of the micro-fluidic chip.

The real-time monitoring part 400 includes a vertical CCD imaging system 401 and a transverse CCD imaging system 402, which respectively monitor the processing position and depth of the micro-channel to be processed in real time.

The control part 500 realizes unified control of the light source part 100, the micro-nano processing platform 302 and the real-time monitoring part 400 through a controller and computer software.

Figure 8:
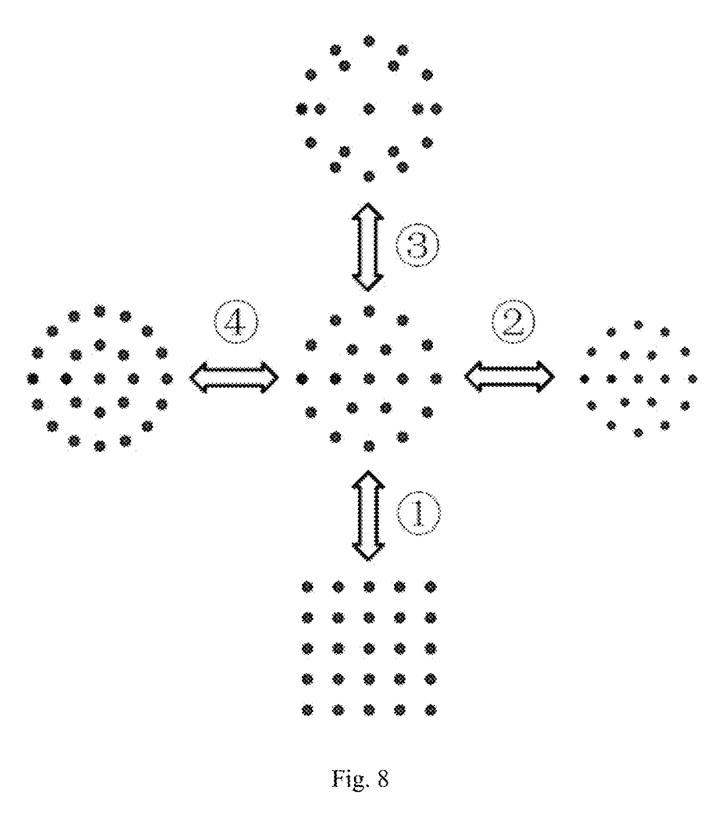
FIG. 8 is a schematic diagram of controlling an array-type multi-focus femtosecond laser according to an embodiment of the disclosure.
Figure 9:
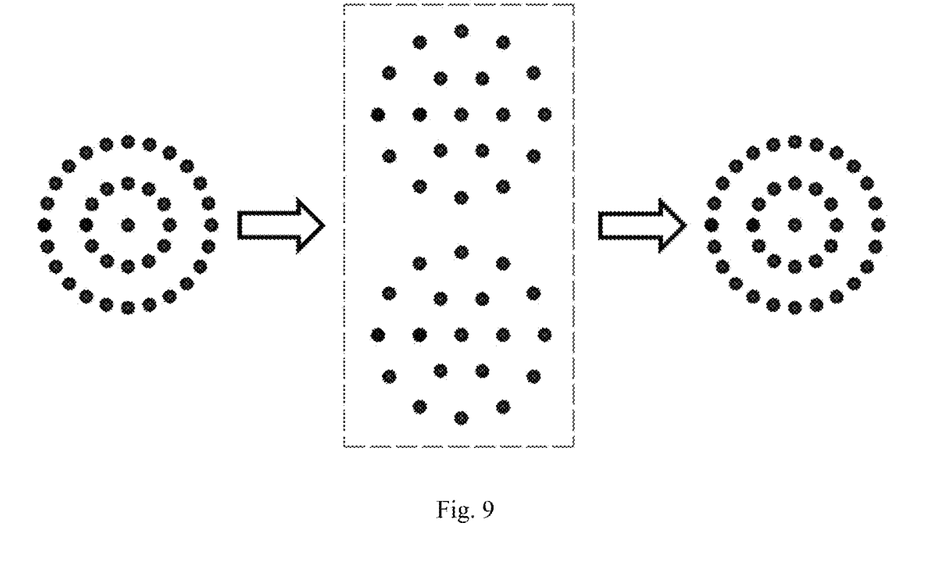
FIG. 9 is a schematic diagram of a splitting and merging of an array-type multi-focus femtosecond laser during processing according to an embodiment of the disclosure.

As shown in FIG. 8, the following control methods can be realized by the array-type multi-focus femtosecond laser. (1) The control of the array; which can realize the adjustment and control of the conversion of the array shape. (2) The control of the array size; the adjustment and control of the size of the array and the change of the energy of each focus can be realized. (3) The control of the array distribution; the adjustment and control of the position distribution and energy distribution of the array focus can be realized. (4) The control of number of focus; the adjustment and control of the number of array focus can be realized. As shown in FIG. 9, by adjusting the array-type multi-focus femtosecond laser, it is possible to split a multi-focus array into two identical multi-focus arrays, or to merge two split multi-focus arrays into a multi-focus array, making dual-channel or even multi-channel ablation processing possible. Those not described in detail in this embodiment are well known in the art which this application pertains to.

The above are only the preferred embodiments of the present disclosure, and are not intended to limit the scope of the present disclosure. Any changes, equivalent modifications and improvements made by those skilled in the art without departing from the spirit of the present disclosure shall fall within the scope of the present disclosure.

What is claimed is:

1. A method for processing micro-channels of a micro-fluidic chip using multi-focus ultrafast laser, comprising:
    (1) performing a fractional ablation on a section of the micro-channels to be processed in the micro-fluidic chip using an array-type multi-focus femtosecond laser, wherein the array-type multi-focus femtosecond laser is prepared from a femtosecond laser by a multi-focus array device using a laser multi-focus technology;
    (2) performing a secondary ablation on the micro-channels to be processed of the micro-fluidic chip using a picosecond or femtosecond ultra-short pulse laser; and
    (3) subjecting the micro-fluidic chip to ultrasonic-assisted hydrofluoric acid etching to dredge the micro-channels to be processed after undergoing the fractional ablation and the secondary ablation;
    wherein the fractional ablation is a main ablation process in processing of the micro-channels to be processed of the micro-fluidic chip; and the secondary ablation is a secondary ablation process in the processing of the micro-channels to be processed of the micro-fluidic chip;
    wherein in step (1) the femtosecond laser is a laser with medium-high energy, and used as a main light source in the processing of the micro-channels of the micro-fluidic chip; the femtosecond laser has a single pulse energy equal to or greater than 10 μJ and a pulse width equal to or less than 200 fs; center wavelengths of the femtosecond laser are 260 nm, 343 nm and 355 nm in ultraviolet range; 400 nm, 515 nm and 532 nm in visible light range; and 800 nm, 1030 nm, 1064 nm and 1550 nm in infrared range; and
    wherein in step (2) the picosecond or femtosecond ultra-short pulse laser for the secondary ablation is used as a secondary light source in the processing of the micro-channels to be processed of the micro-fluidic chip; center wavelengths of the picosecond or femtosecond ultra-short pulse laser are 1030 nm and 1064 nm; individual focuses of the femtosecond laser are synchronous or asynchronous.

2. The method of claim 1, wherein after the fractional ablation, a size of a non-ablated area between the individual focuses is less than or equal to 200 μm; and the micro-fluidic chip is made of a fused silica material, calcium fluoride, a transparent ceramic or an organic polymer doped with $SiO_2$.

3. The method of claim 1, wherein in step (1) the laser multi-focus technology enables an array output of the femtosecond laser, and the array-type multi-focus femtosecond laser is an array-type planar two-dimensional multi-focus femtosecond laser or an array-type spatial three-dimensional multi-focus femtosecond laser; and the laser multi-focus technology is spatial light modulation technology, micro-lens array technology, micro-hole array technology, optical fiber array technology or a combination thereof;

the spatial light modulation technology is used to output the array-type spatial three-dimensional multi-focus femtosecond laser using a spatial light modulator through tight focusing of a high-power objective lens;

the micro-lens array technology is used to output the array-type planar two-dimensional multi-focus femtosecond laser by using a micro-lens array;

the micro-hole array technology is able to split the femtosecond laser into an array-type by using a microhole array, and then focus the array-type beam to output the array-type planar two-dimensional multi-focus femtosecond laser; and the optical fiber array technology enables a laser to directly output an array-type beam by using optical fiber beam splitting cascade amplification or seed light beam splitting multipath amplification, and then focuses the array-type beam to output the array-type planar two-dimensional multi-focus femtosecond laser.

4. The method of claim 3, wherein the array-type planar two-dimensional multi-focus femtosecond laser adopts a loose focusing mode with a focal length of 5-100 mm; the array-type planar two-dimensional multi-focus femtosecond laser has an array-type multi-focus distribution in a section direction of a laser beam; the array-type planar two-dimensional multi-focus femtosecond laser generates multiple plasma light filaments in a transmission direction of the laser beam; and the array-type planar two-dimensional multi-focus femtosecond laser is used to process longitudinal and transverse micro-channels of the micro-fluidic chip by femtosecond laser multi-focus ablation and femtosecond laser multi-light-filament ablation;

the array-type spatial three-dimensional multi-focus femtosecond laser adopts a tight focusing mode with a focal length of 0-5 mm; the array-type spatial three-dimensional multi-focus femtosecond laser has an array-type multi-focus distribution in both the section direction and the transmission direction of the laser beam; and the array-type spatial three-dimensional multi-focus femtosecond laser is used to process the longitudinal and transverse micro-channels of the micro-fluidic chip by using the femtosecond laser multi-focus ablation;

array mode, array pitch and array range of the array-type planar two-dimensional multi-focus femtosecond laser and the array-type spatial three-dimensional multi-focus femtosecond laser are adjustable; and the multiple plasma light filaments in the transmission direction of the laser beam are adjustable, so as to meet requirements of shape and size of the micro-channels to be processed of the micro-fluidic chip.

5. The method of claim 4, wherein the array-type spatial three-dimensional multi-focus femtosecond laser is distributed in a spatial array, and the array mode, array pitch and array range are adjustable to make a contour size of the array-type spatial three-dimensional multi-focus femtosecond laser consistent with a size of the micro-channels to be processed; the number of the individual focuses and a focus distance of the femtosecond laser are adjusted to control and improve a processing precision for a shape of sections of the micro-channels to be processed, so that the sections of the micro-channels processed in different directions are kept consistent; the shape of the sections of the micro-channels to be processed is circle, ellipse, rectangle or triangle; and a single scanning ablation of the multi-focus femtosecond laser is able to complete processing of micro-channels of a millimeter-level micro-fluidic chip.

6. The method of claim 3, wherein the array-type spatial three-dimensional multi-focus laser is configured to distribute laser energy according to positions of the focuses of the femtosecond laser, and adjust a power of multi-focus laser to be greater than a damage threshold of a material of the micro-fluidic chip, so as to meet ablation processing requirements of the micro-channels to be processed on the micro-fluidic chip.

7. The method of claim 1, wherein in step (2), the secondary ablation is performed by scanning the micro-channels to be processed of the micro-fluidic chip single time or multiple times, and enhance an impact effect, thermal effect and multiphoton effect on a non-ablated area of the micro-channels to be processed.

8. The method of claim 1, wherein a pulse delay of the picosecond or femtosecond ultra-short pulse laser in step (2) is controlled, such that a pulse of the picosecond or femtosecond ultra-short pulse laser in step (2) is controlled to be after a pulse of the multi-focus femtosecond laser, enabling the secondary ablation while the fractional ablation is performed;

a pulse delay time is 10 ps-200 ns; or the secondary ablation is performed in the same scan path as the fractional ablation after the fractional ablation is completed.

9. The method of claim 1, wherein the array-type multi-focus femtosecond laser in step (1) and the picosecond or femtosecond ultra-short pulse laser in step (2) are focused to a position to be processed in the same direction by beam combining; or the array-type multi-focus femtosecond laser in step (1) and the picosecond or femtosecond ultra-short pulse laser in step (2) are focused to the position to be processed in different directions, respectively; and directions of the array-type multi-focus femtosecond laser in step (1) and the picosecond or femtosecond ultra-short pulse laser in step (2) are parallel or perpendicular to each other.

10. The method of claim 1, wherein in the ultrasonic-assisted hydrofluoric acid etching, an ablated area on the micro-channels to be processed is etched by hydrofluoric acid, and a non-ablated area is detached during ultrasonic treatment; and the ultrasonic-assisted hydrofluoric acid etching is performed after the fractional ablation, or after the secondary ablation.

* * * * *